(12) United States Patent
Yamaguchi et al.

(10) Patent No.: US 10,003,209 B2
(45) Date of Patent: Jun. 19, 2018

(54) CHARGE PERIOD ADJUSTING APPARATUS, CHARGE SYSTEM, AND CHARGE PERIOD ADJUSTING PROGRAM

(71) Applicants: KABUSHIKI KAISHA TOSHIBA, Minato-ku (JP); TOSHIBA SOLUTIONS CORPORATION, Kawasaki-shi (JP)

(72) Inventors: Naoki Yamaguchi, Kodaira (JP); Kazuya Irisawa, Tachikawa (JP); Mitsuyoshi Akiyama, Chofu (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 56 days.

(21) Appl. No.: 14/774,443

(22) PCT Filed: Mar. 11, 2013

(86) PCT No.: PCT/JP2013/001573
§ 371 (c)(1),
(2) Date: Sep. 10, 2015

(87) PCT Pub. No.: WO2014/141315
PCT Pub. Date: Sep. 18, 2014

(65) Prior Publication Data
US 2016/0028253 A1   Jan. 28, 2016

(51) Int. Cl.
*H01M 10/44* (2006.01)
*H01M 10/46* (2006.01)
(Continued)

(52) U.S. Cl.
CPC ............. *H02J 7/007* (2013.01); *B60L 11/185* (2013.01); *B60L 11/1816* (2013.01);
(Continued)

(58) Field of Classification Search
CPC ......... H02J 7/007; H02J 7/041; B60L 11/185; B60L 11/1844; B60L 11/1861;
(Continued)

(56) References Cited

U.S. PATENT DOCUMENTS 8,803,480 B2 * 8/2014 Muto ................. B60L 11/1842
320/128
2010/0017045 A1   1/2010 Nesler et al.
(Continued)

FOREIGN PATENT DOCUMENTS

JP    2010 98793    4/2010
JP    2011 83165    4/2011
(Continued)

OTHER PUBLICATIONS

International Search Report dated May 28, 2013 in PCT/JP13/001573 Filed Mar. 11, 2013.
(Continued)

*Primary Examiner* — Nha Nguyen
(74) *Attorney, Agent, or Firm* — Oblon, McClelland, Maier & Neustadt, L.L.P.

(57) ABSTRACT

[PROBLEM] To provide a technology of effectively using supplied electric power through adjustment of a charge schedule period of an EV.
[SOLVING MEANS] A charge period adjusting apparatus according to embodiments includes an acquiring section and a control section. The acquiring section is configured to acquire a power supply schedule amount of an electric system including a charger connected during charge of an electric vehicle. The control section is configured to set a charge period such that the electric vehicle is charged by the charger in a time frame in which the power supply schedule amount acquired by the acquiring section exceeds a threshold value.

14 Claims, 11 Drawing Sheets

(51) Int. Cl.
*H02J 7/00* (2006.01)
*H02J 7/04* (2006.01)
*B60L 11/18* (2006.01)

(52) U.S. Cl.
CPC ....... *B60L 11/1844* (2013.01); *B60L 11/1861* (2013.01); *H02J 7/041* (2013.01); *B60L 2230/22* (2013.01); *B60L 2230/24* (2013.01); *B60L 2240/66* (2013.01); *B60L 2240/80* (2013.01); *B60L 2250/12* (2013.01); *B60L 2260/50* (2013.01); *B60L 2260/52* (2013.01); *B60L 2260/54* (2013.01); *B60L 2260/58* (2013.01); *Y02E 60/721* (2013.01); *Y02T 10/7005* (2013.01); *Y02T 10/705* (2013.01); *Y02T 10/7044* (2013.01); *Y02T 10/7094* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y04S 10/126* (2013.01)

(58) Field of Classification Search
CPC .............. B60L 11/1816; B60L 2230/24; B60L 2240/66; B60L 2250/12; B60L 2260/50; B60L 2230/22; B60L 2260/58; B60L 2260/54; B60L 2260/52; B60L 2240/80; Y02T 90/16; Y02T 10/7291; Y02T 90/121; Y02T 10/705; Y02T 90/128; Y02T 10/7044; Y02T 90/14; Y02T 10/7094; Y02T 10/7005; Y04S 10/126; Y02E 60/721
See application file for complete search history.

(56) References Cited

U.S. PATENT DOCUMENTS

| | | |
|---|---|---|
| 2011/0202221 A1 | 8/2011 | Sobue et al. |
| 2012/0007563 A1 | 1/2012 | Muto et al. |
| 2012/0277923 A1 | 11/2012 | Tsuchiya |
| 2013/0009599 A1* | 1/2013 | Yukizane ............ B60L 11/1816 320/109 |
| 2013/0093393 A1* | 4/2013 | Shimotani ................ B60L 3/12 320/109 |
| 2014/0006137 A1* | 1/2014 | Melen ................ G06Q 10/1093 705/14.35 |

FOREIGN PATENT DOCUMENTS

| | | |
|---|---|---|
| JP | 2011-188729 A | 9/2011 |
| JP | 2011-188731 A | 9/2011 |
| JP | 2012-100453 A | 5/2012 |
| JP | 2012 235541 | 11/2012 |
| JP | 2013 17268 | 1/2013 |
| WO | WO 2010/042550 A2 | 4/2010 |
| WO | WO 2010/109888 A1 | 9/2010 |

OTHER PUBLICATIONS

Japanese Office Action dated Apr. 21, 2015 in a corresponding Application No. JP 2014-536057.

* cited by examiner

1.

2.

CHARGEABLE TIME FRAME(FIRST)   CHARGEABLE TIME FRAME(SECOND)

3.

CHARGEABLE TIME FRAME

US 10,003,209 B2

CHARGE PERIOD ADJUSTING APPARATUS, CHARGE SYSTEM, AND CHARGE PERIOD ADJUSTING PROGRAM

TECHNICAL FIELD

The present invention relates to a technology of effectively using generated electricity.

BACKGROUND ART

Conventional Electric Vehicles (hereinafter abbreviated as EVs) start to be charged in response to a user connecting the EV with a dedicated charge stand and providing an instruction to start charge through manual operation or simultaneously with connection of a power cable to the EV. Some EVs use electric power generated with renewable energy such as sunlight, water power, and wind power.

DISCLOSURE OF THE INVENTION

Problems to be Solved by the Invention

In conventional configurations, the charge of EVs is started at the time when the power cable is connected to the EV or when a user performs the operation for start. The charge is thus performed regardless of the state of a power system or the status of power generation with renewable energy.

The amount of power generated by the renewable energy cannot be controlled, and excess power (hereinafter referred to as an overload as required) may be produced in the power system. A possible approach to stabilizing the power system is to store the overload in a large-capacity mounted battery. The large-capacity battery, however, is expensive and cannot be mounted easily.

It is an object of the present invention to provide a technology of effectively using supplied electric power through adjustment of a charge schedule period of an EV.

Means for Solving the Problems

A charge period adjusting apparatus according to embodiments includes an acquiring section and a control section. The acquiring section is configured to acquire a power supply schedule amount of an electric system including a charger connected during charge of an electric vehicle. The control section is configured to set a charge period such that the electric vehicle is charged in a time frame in which the power supply schedule amount acquired by the acquiring section exceeds a threshold value.

A charge system according to embodiments includes a predicting apparatus and a charge period adjusting apparatus. The predicting apparatus is configured to calculate a power supply amount scheduled to be supplied from renewable energy. The charge period adjusting apparatus is configured to include the power supply amount calculated in the predicting apparatus, to acquire a power supply schedule amount of an electric system including a charger connected during charge of an electric vehicle, and to set a charge period such that the electric vehicle is charged by the charger in a time frame in which the power supply schedule amount exceeds a threshold value.

MODE FOR CARRYING OUT THE INVENTION

In each embodiment below, the future status of power generation with renewable energy is predicted, and a charge start time and a charge end time defining a charge period are adjusted such that charge of an EV is performed to coincide with a time frame in which an overload is present. This can eliminate the need to mount a large-capacity battery and can charge the EV with excess power, if produced.

In each embodiment below, description is made of a distribution center responsible for managing a use start time and a use end time of the EV, and a running distance during use, including their schedules. Aspects of the present invention are not limited thereto, and a general user who uses the EV may implement the aspect of each embodiment.

Embodiment 1

Figure 1:
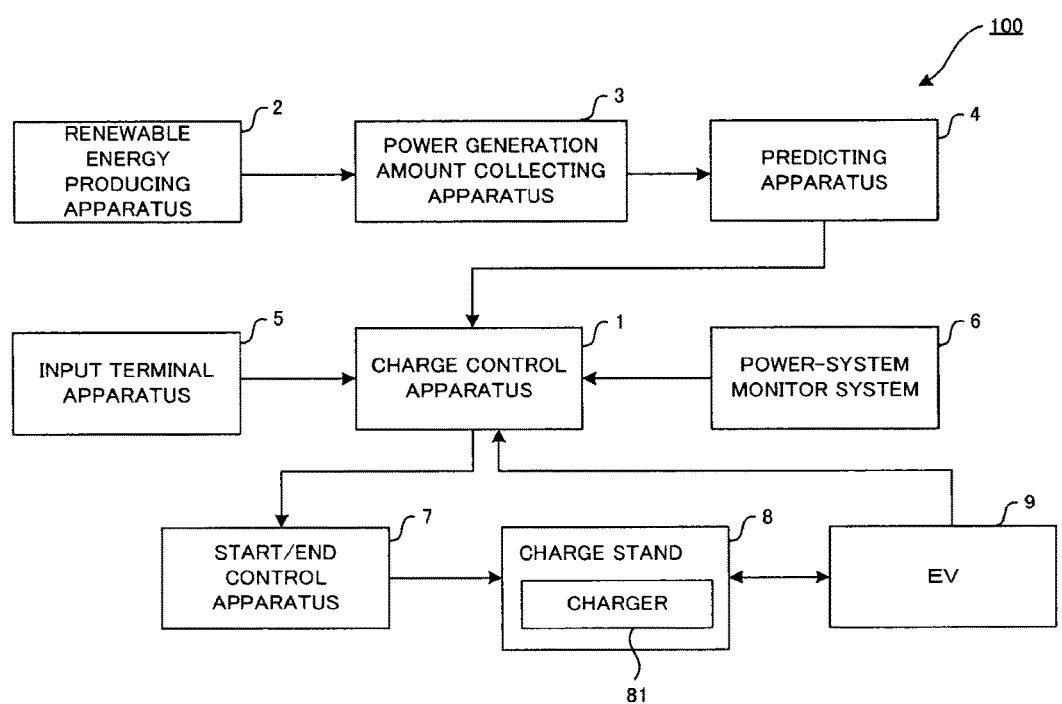
[FIG. 1] A block diagram showing an exemplary configuration of a system according to Embodiment 1.

FIG. 1 is a schematic diagram of a charge system according to Embodiment 1. A charge system 100 includes a charge control apparatus 1 (charge period adjusting apparatus), a renewable energy producing apparatus 2, a power generation amount collecting apparatus 3, a predicting apparatus 4, an input terminal apparatus 5 (terminal apparatus), a power-system monitor system 6, a start/end control apparatus 7, a charge stand 8, and an EV 9 (electric vehicle). These apparatuses may each include a single configuration, or some or all of the apparatuses may each include a plurality of configurations. Although the present embodiment includes the single EV 9 to be managed, a plurality of EVs may be managed.

The renewable energy producing apparatus 2 is an apparatus such as a facility for power generation with sunlight, a hydroelectric power generation facility, and a wind power generation facility which produces electric power by using renewable energy such as sunlight, water power, and wind power. The renewable energy producing apparatus 2 may be an apparatus which generates power by using other natural energy such as geothermal heat.

The power generation amount collecting apparatus 3 collects an amount of power generation (in KWs) produced by renewable energy producing apparatus 2 in hours and calculates the past results. Although the past results can be given in watts per hour (KW/h) in the present embodiment, watts per minute or per second may be used.

The predicting apparatus 4 acquires information about weather forecast, prediction of water power amount, and prediction of wind power amount from outside. The predicting apparatus 4 calculates a future power supply amount with the renewable energy in hours from the acquired information about weather forecast, prediction of water power amount, and prediction of wind power amount based on the correlation between the past results of power generation amounts calculated by the power generation amount collecting apparatus 3 and the weather conditions, water power amounts, and wind power amounts at the times when the past results were obtained.

The input terminal apparatus 5 is a personal computer or a mobile terminal device and is a terminal apparatus for allowing a user who manages the EV 9 to input information. The user inputs information about a use schedule period of the EV 9 (scheduled time of use start and scheduled time of use end) and information about a scheduled running distance of the EV 9 to the input terminal apparatus 5. The scheduled running distance may be information about a destination. In this case, the input terminal apparatus 5 or the charge control apparatus 1 calculates a round-trip distance between the distribution center and the destination based on a conventional technology.

The power-system monitor system 6 monitors and controls, for example, power generation amounts in thermal power generation and water power generation managed by an electric power company, and provides a future supply power amount in the power system including the charge stand 8 (the amount of power supplied by thermal power generation and water power generation). The power-system monitor system 6 provides the past results and future prediction information in watts per hour (KW/h) for the charge control apparatus 1. The prediction information provided by the power-system monitor system 6 does not include a power generation schedule amount in the renewable energy producing apparatus 2. The power-system monitor system 6 also provides information about a time frame in which the power system is scheduled to stop power supply due to construction or the like (start schedule time and end schedule time of the stop).

The charge control apparatus 1 acquires the information about the future power generation amount with the renewable energy from the predicting apparatus 4 and acquires the information about the future power amount from the power-system monitor system 6. Each of the prediction amounts is a power schedule amount to be supplied into the power system including the charge stand 8 and is a predicted power amount per hour (KW/h) in the present embodiment. The charge control apparatus 1 also acquires the information about the use start time and use end time of the EV 9 and the information about the scheduled running distance during the use from the input terminal apparatus 5. The charge control apparatus 1 calculates an amount of charge with which the EV 9 can run over the scheduled running distance. The charge control apparatus 1 acquires a remaining battery level from the EV 9 (although wireless communication is used for a communication means, wired communication is possible), and calculates a period required to reach the calculated charge amount.

The charge control apparatus 1 uses the acquired information and calculated information to set the charge start time and end time of the EV 9 (each is a scheduled time). Specifically, the charge control apparatus 1 uses the predicted power generation amount with the renewable energy and the future predicted power amount obtained from the power-system monitor system 6 to determine the charge period such that charge is performed in a time frame in which more renewable energy can be used or a time frame in which a system load is higher, and stores the determined charge period in a storage section or the like.

The start/end control apparatus 7 requests the charge stand 8 to start or end charge at the time indicated by the charge control apparatus 1. The charge stand 8 includes a charger 81 and starts or ends charge of the EV 9 at the time indicated by the start/end control apparatus 7. The charge stand 8 performs charge on condition that it is connected to the EV 9. When it is not connected to the EV 9 at the charge start time, a notification may be provided by the charge control apparatus 1, the start/end control apparatus 7, or the charge stand 8.

The EV 9 is an electric vehicle which includes a battery and an electric motor and runs by driving the motor with electric power supplied from the battery. The EV 9 has a mechanism which can communicate with the charge control apparatus 1 via a network. The EV 9 periodically transmits information about its remaining battery level to the charge control apparatus 1. The transmission is performed through a communicating means according to a conventional technology.

Figure 2:
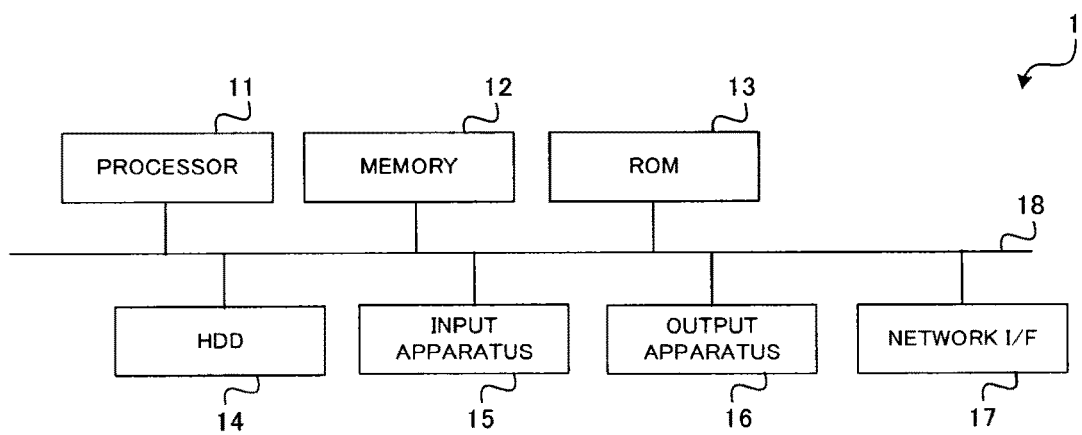
[FIG. 2] A block diagram showing an exemplary hardware configuration of a charge control apparatus.

FIG. 2 is a diagram showing an exemplary hardware configuration of the charge control apparatus 1. The charge control apparatus 1 is a computer in the present embodiment and includes a processor 11 (control section), a memory 12, a Read Only Memory (ROM) 13, a Hard Disk Drive (HDD) 14, an input apparatus 15, an output apparatus 16, and a network interface (I/F) 17. These components transmit and receive control signals and data through a communication bus 18.

The processor 11 is a computing apparatus such as a Central Processing Unit (CPU) and loads programs stored in the ROM 13 and the HDD 14 into the memory 12 to perform computing. This allows the processor 11 to achieve various types of processing in accordance with the programs. The memory 12 is a volatile main storage. The ROM 13 is a non-volatile storage for permanent storing and has a Basic Input Output System (BIOS) for system start-up or the like previously stored therein. The HDD 14 is an auxiliary storage for permanent storing. Data and programs used by the user and an operating system are stored in the HDD 14.

The input apparatus 15 is an apparatus which receives input of information from the user to the charge control apparatus 1, and includes a keyboard, a mouse or the like. The output apparatus 16 is an apparatus which notifies the user of the details or results of processing in the charge control apparatus 1, and includes a monitor, a printer or the like. The network I/F 17 is a unit responsible for communication with equipment external to the charge control apparatus 1, and includes a Local Area Network (LAN) board, a unit and a mechanism for controlling near field communication. The communication of the network I/F 17 with external equipment may be wired or wireless. The network I/F 17 may include a terminal compliant with Universal Serial Bus (USB) specifications such that an external HDD or a USB memory can be connected to allow input and output of information. Although the information from the predicting apparatus 4, the input terminal apparatus 5, the power-system monitor system 6, and the EV 9 is obtained via the network I/F 17, some or all of the information may be provided through manual input by the user with the input apparatus 15.

Figure 3:
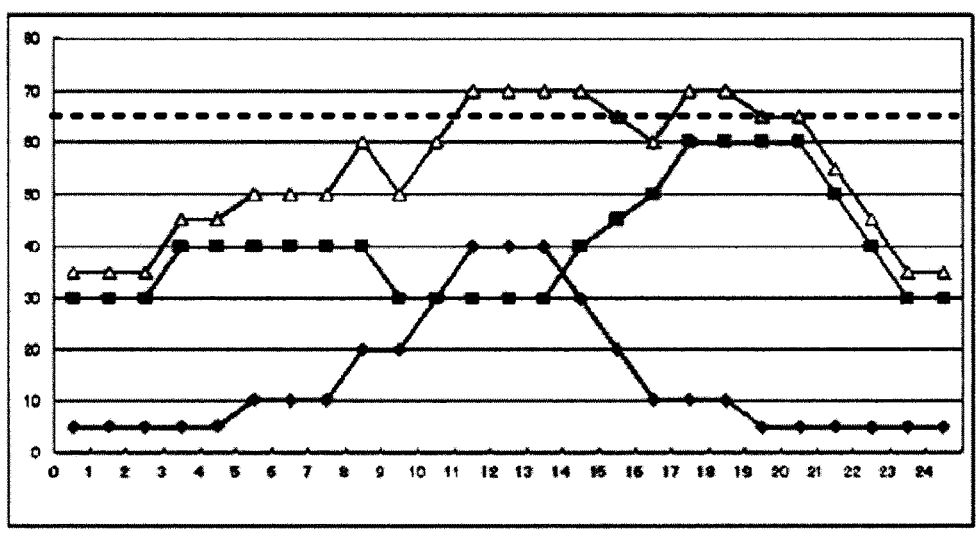
[FIG. 3] A graph showing an example of prediction in each power generation in which the horizontal axis represents time.

Next, FIG. 3 shows an example of the power generation prediction amount in the renewable energy producing apparatus 2 (renewable energy prediction amount) acquired by the charge control apparatus 1 and the predicted power amount provided by the power-system monitor system 6 (system load prediction amount). In FIG. 3, the horizontal axis represents time (in hours) and the vertical axis represents percentage assuming that the maximum power amount (KW) allowable by the system is 100. The renewable energy prediction amount is shown by a curved line with black circles in FIG. 3 and relies mainly on solar energy in this example. Thus, the power generation amount increases in the daytime and reduces in the nighttime. The system load prediction amount is shown by a curved line with black squares in FIG. 3 and represents power generation regulated by the electric power company or the like. Thus, the power generation amount is increased in a time frame in which the power use amount is large and is limited in a time frame in which the power use amount is small. In this example, the power generation amount is increased in the early morning and in the evening and is limited in the daytime after 9 and in the nighttime after 20.

The charge control apparatus 1 calculates a total prediction amount by adding the renewable energy prediction amount to the system load prediction amount. The total prediction amount is shown by a curved line with white triangles in FIG. 3 and approximately corresponds to the total power amount (KW) in the system. The charge control apparatus 1 determines whether or not the total prediction amount exceeds a threshold value (shown by a broken line in FIG. 3). Although the threshold value is 65% in the example, the aspects are not limited thereto. In the example of FIG. 3, the total prediction amount exceeds the threshold value from about 11 to about 15:30 and from about 17 to about 19:30. Since these time frames in which the threshold value is exceeded have a margin for power supply, the EV 9 is desirably charged in these time frames. The charge control apparatus 1 performs scheduling such that the EV 9 is charged in a time frame in which the threshold value is exceeded (hereinafter referred to as an overload time frame) wherever possible.

Although the vertical axis in FIG. 3 represents the percentage in the example, it may represent watts (KW). In this case, each of the prediction amounts and the threshold value are also represented in watts (KW). The threshold value may be a defined value stored previously in the storage section such as the HDD 14 and may be reset by the user such as a manager.

Figure 4:
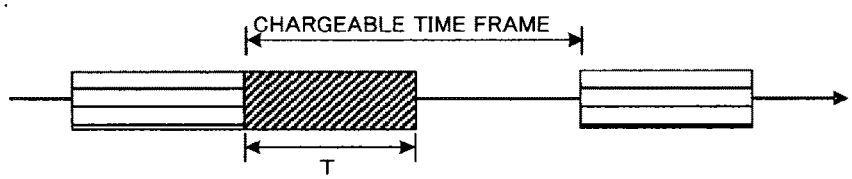
[FIG. 4] Diagrams showing a normal case, a case with a non-chargeable time frame, a case with an overload time frame, for describing these cases.
Figure 4:
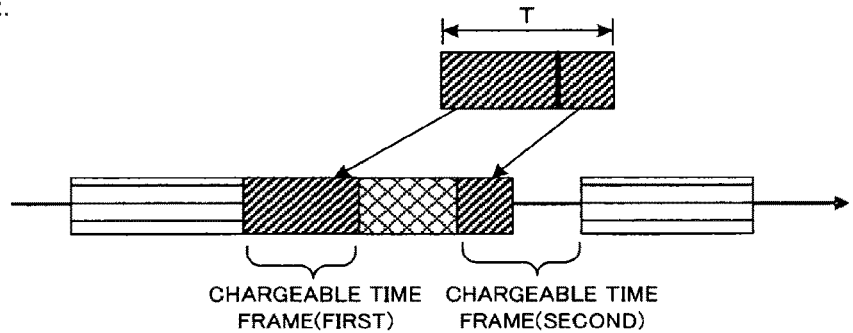
Figure 4:
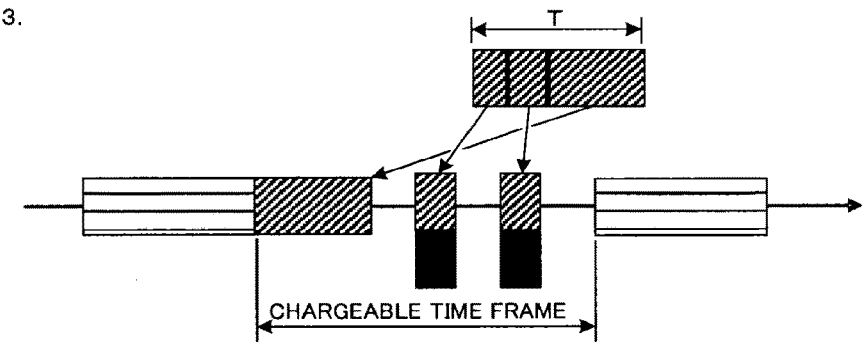
Figure 4:
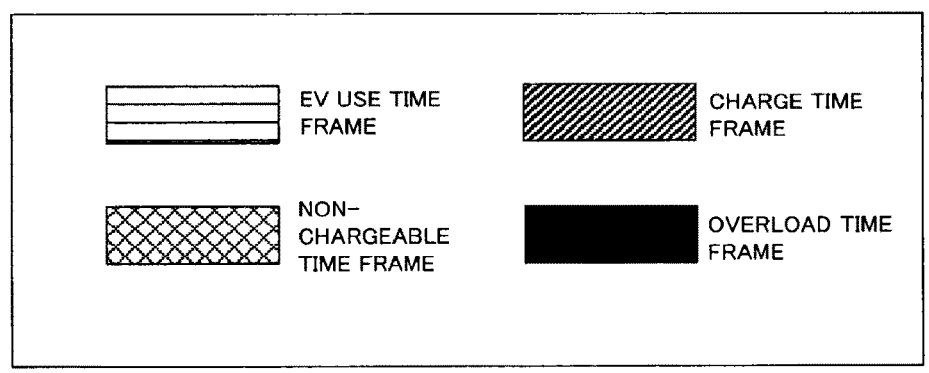

FIG. 4 shows diagrams for describing examples of adjustment of a charge schedule in respective cases. In each diagram of FIG. 4, the horizontal axis represents time. In FIG. 4, each block with horizontal lines represents an EV use time frame, each block with oblique lines represents a charge time frame (period required for charge), each block with checks represents a non-chargeable time frame, and each block in black color represents the overload time frame. The following description is made assuming that the charge time frame (period required for charge) is represented as T.

FIG. 4.1. shows a normal case. The normal case is a case without any non-chargeable time frame due to construction or the like or any system-over time frame. Naturally, charge of the EV 9 is scheduled to be performed in a time frame (chargeable time frame in FIG. 4) between use time frames of the EV 9, and in the present embodiment, the schedule is adjusted to be close to the beginning of the time frame such that the charge is performed in an early stage. Specifically, the charge control apparatus 1 sets the charge to be started immediately after the use of the EV 9 is ended.

FIG. 4.2 shows a case where a non-chargeable period is present. This is a case where the non-chargeable time frame appears within a chargeable time frame. In this case, the charge control apparatus 1 performs scheduling such that charge is performed in a period excluding the non-chargeable time frame. The charge control apparatus 1 adjusts the charge period to be close to the beginning of the chargeable time frame. When the period T does not fall within the first chargeable time frame, the charge control apparatus 1 divides the period T, temporarily ends the charge at the time when the non-chargeable period starts, and starts the subsequent (second) charge after the elapse of the non-chargeable period. The charge control apparatus 1 calculates a charge start time and a charge end time for each of the first and second charges.

FIG. 4.3 shows a case where the overload time frame is present. This is a case where the overload time frame appears in a chargeable time frame. In this case, the charge control apparatus 1 performs scheduling such that the EV 9 is charged in the overload time frame with a higher priority. When the charge cannot be completed within the overload time frame, the charge control apparatus 1 schedules the remaining charge to be close to the beginning of the chargeable time frame.

Figure 5:
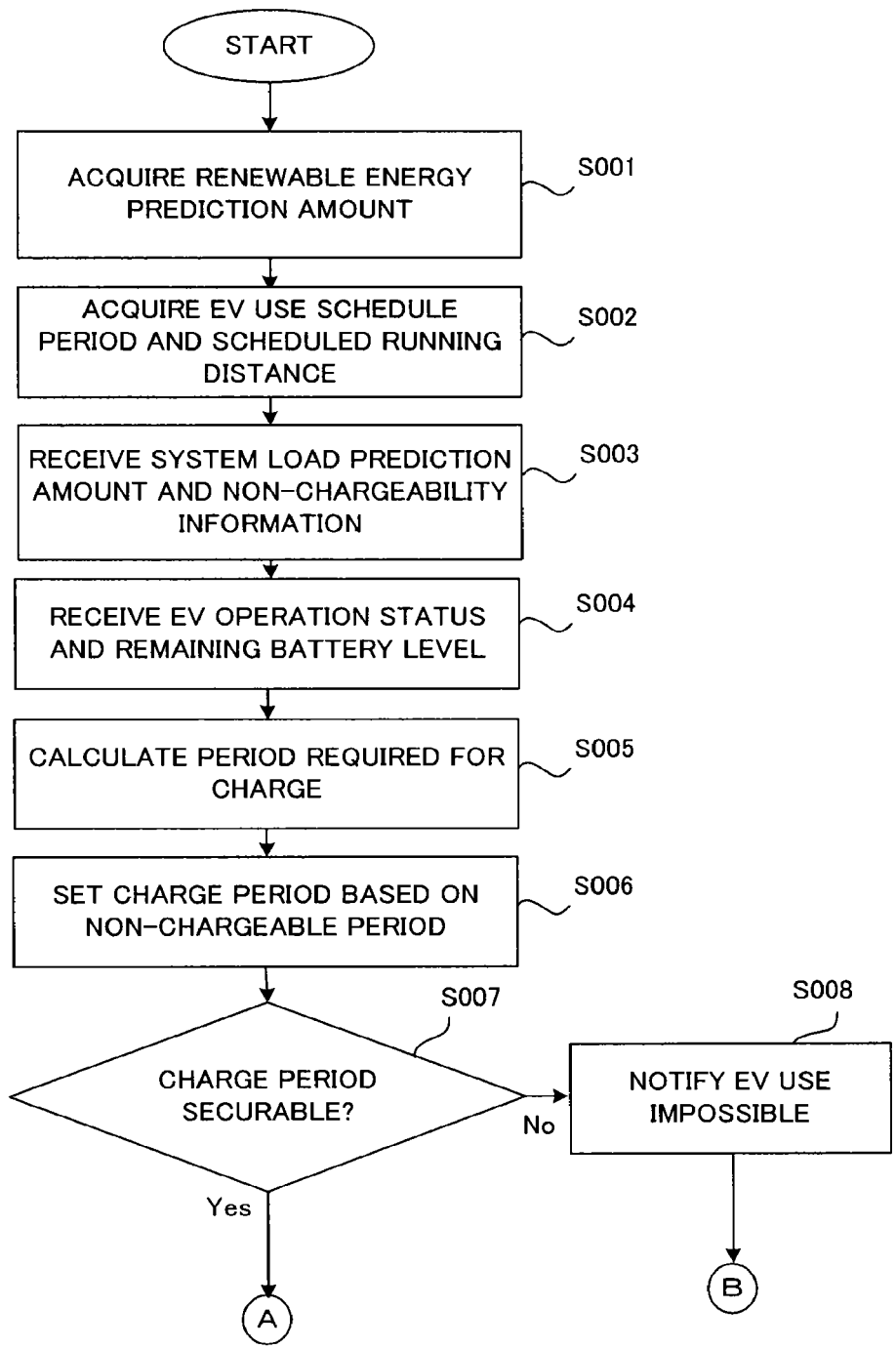
[FIG. 5] A flow chart (1) showing an exemplary operation of the charge control apparatus according to Embodiment 1.
Figure 6:
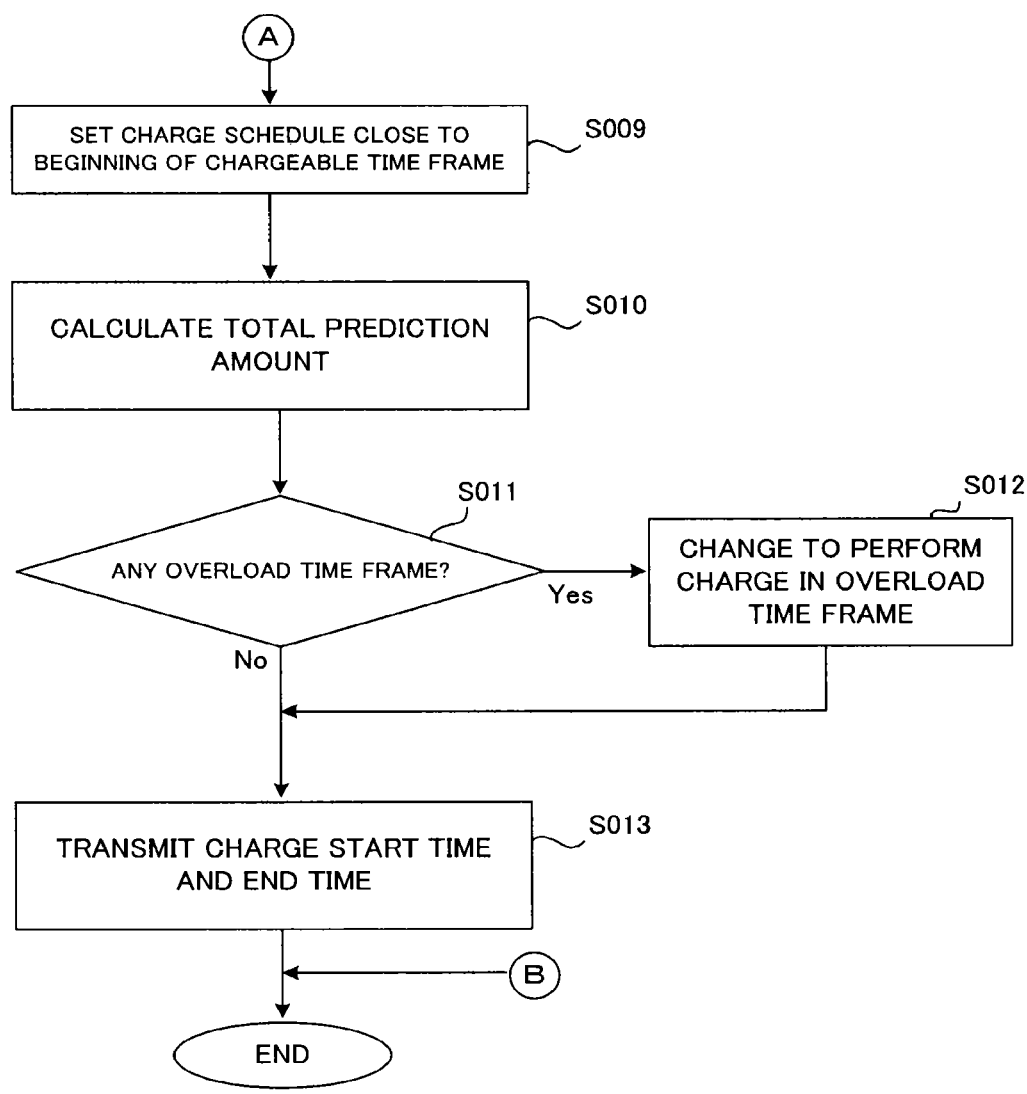
[FIG. 6] A flow chart (2) showing the exemplary operation of the charge control apparatus according to Embodiment 1.

FIG. 5 and FIG. 6 are flow charts showing an exemplary operation of the charge control apparatus 1.

The network I/F 17 of the charge control apparatus 1 periodically receives, from the predicting apparatus 4, the renewable energy prediction amount (KW/h) scheduled to be produced in the renewable energy producing apparatus 2 (S001). The renewable energy prediction amount is a power prediction amount from the renewable energy to be supplied to the power system including the charge stand 8 (charger 81). Although the prediction amount for three days is received in this example, the present invention is not limited thereto. This depends on the accuracy of weather forecast and the like. The processor 11 stores the renewable energy prediction amount in the memory 12 or the HDD 14.

The network I/F 17 receives, from the input terminal apparatus 5, the information about the use schedule period of the EV (scheduled time of use start and scheduled time of use end) and about the scheduled running distance (S002). The input terminal apparatus 5 transmits the use schedule period and the scheduled running distance at any time when the user inputs the information. The processor 11 stores the information in the memory 12 or the HDD 14. It should be noted that the network I/F 17 may receive the information about the destination instead of the distance information and calculate the round-trip distance between the distribution center and the destination. When the user performs manual input, the input apparatus 15 acquires the information about the use schedule period and the scheduled running distance or the information about the destination, and the processor 11 stores the information in the memory 12 or the HDD 14.

The network I/F 17 of the charge control apparatus 1 periodically receives, from the power-system monitor system 6, the system load prediction amount (KW/h) of the power system including the charge stand 8 (charger 81) and information about a time at which charge becomes impossible (S003). The system load prediction amount obtained from the power-system monitor system 6 does not include the amount of power produced with the renewable energy as described above. The non-chargeability information is information indicating a time at which power supply becomes impossible due to construction or the like within the power system including the charge stand 8. The processor 11 stores the system load prediction amount and the non-chargeability information in the memory 12 or the HDD 14.

The network I/F 17 periodically receives the operation status of an EV of interest (the EV 9 in this case) and the remaining battery level from the EV 9 (S004). The processor 11 stores the obtained information in the memory 12 or the HDD 14. The processor 11 calculates a period required to charge the EV from the scheduled running distance of the EV 9 provided by the input terminal apparatus 5 and the remaining battery level (S005). Specifically, the processor 11 calculates how much power is consumed for running over the scheduled running distance, and calculates the period required to charge the EV 9 from the consumption amount and the remaining battery level. The period required for charge is a charge period in the charger 81 necessary to reach a charge amount with which the scheduled running distance can be completed.

The processor 11 of the charge control apparatus 1 determines and sets a scheduled time of charge start and a scheduled time of charge end by taking account of the future use start time and use end time of the EV 9 and the future time at which charge becomes impossible (S006). When the chargeable time frame of the EV 9 (see FIG. 4) and the non-chargeable time frame are mixed, the processor 11 divides the time frame and sets charge start and end times such that the non-chargeable time frame is excluded, as shown by Case 2 in FIG. 4. The details of the processing at step S006 are described later.

The processor 11 compares the chargeable time frame (see FIG. 4) with the period required for charge to determine whether or not the charge period for the EV 9 can be secured (S007). If not (No at S007), the processor 11 disables the use schedule of the EV 9 and outputs a message requesting a change to the use schedule to the display device 16 or an external notifying section (S008).

When the period required for charge can be secured (Yes at S007), the processor 11 sets a charge schedule to be close to the beginning of the chargeable time frame such that charge is started and ended at the earliest possible time (S009). Specifically, the processor 11 sets a charge start time at the use end time of the EV 9 and calculates a charge end time by adding the period required for charge to that charge start time. Step S009 is performed in the normal case (Case 1 in FIG. 4). In a case with non-chargeable time frame (Case 2 in FIG. 4), the schedule is adjusted at step S006.

The processor 11 calculates the total prediction amount based on the renewable energy prediction amount and the system load prediction amount (S010). Although the total prediction amount is calculated by adding the renewable energy prediction amount to the system load prediction amount as shown in FIG. 3 in this example, the calculation method is not limited thereto.

The processor 11 determines whether or not there is a time frame (overload time frame) in which the total prediction amount exceeds the threshold value (S011). If no overload time frame is present (No at S011), the processing proceeds to S013. If any overload time frame is present (Yes at S011), the processor 11 changes the charge schedule such that charge is performed in that overload time frame with a higher priority (S012). The details of the processing at step S012 are described later.

The processor 11 outputs the scheduled time of charge start and the scheduled time of charge end set up to this point to the network I/F 17 for transmission to the start/end control apparatus 7. The network I/F 17 transmits the charge start and end times of the EV 9 to the start/end control apparatus 7 (S013). The start/end control apparatus 7 controls the start and end of charge in the charge stand 8 in accordance with the charge start and end times.

Figure 7:
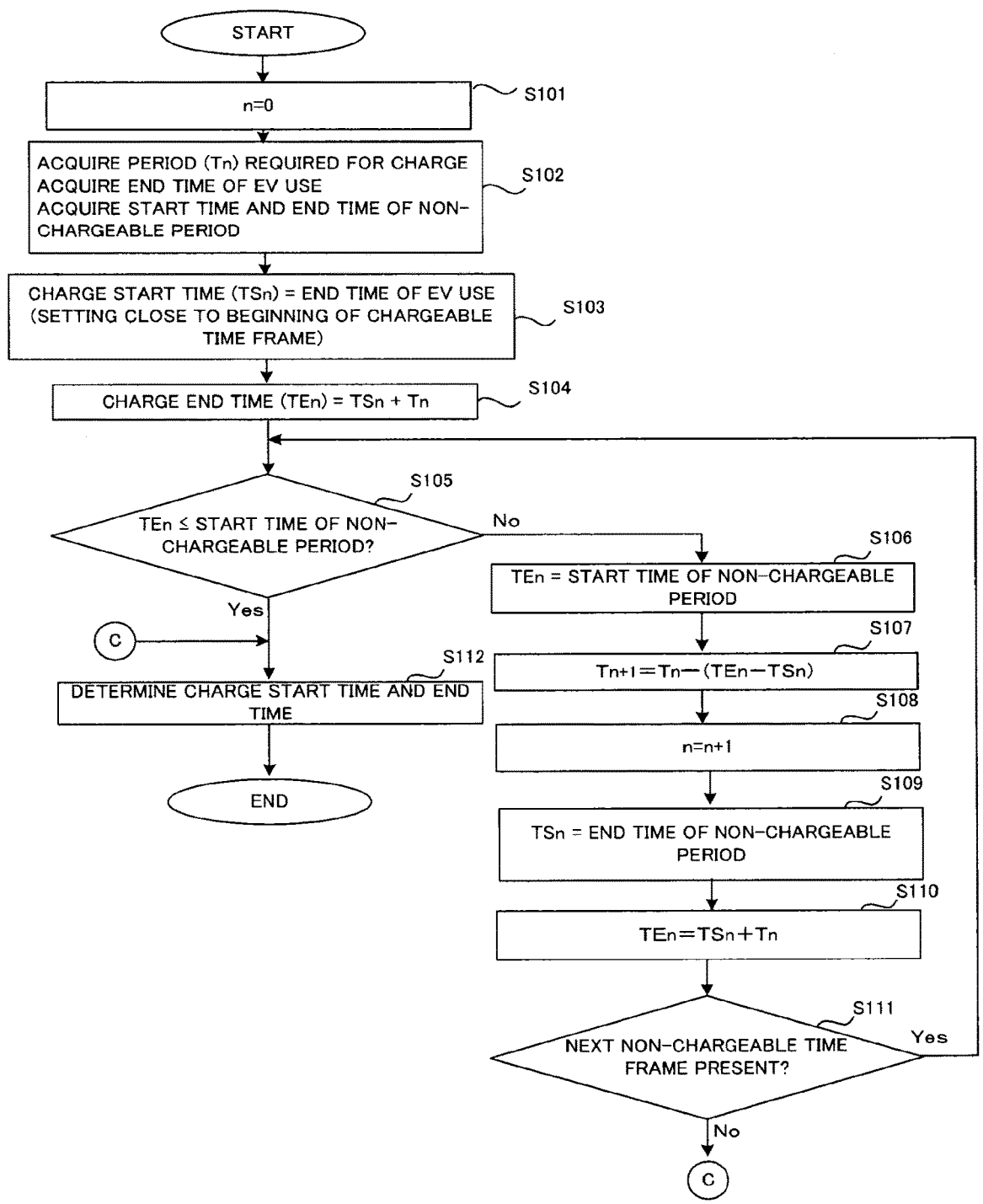
[FIG. 7] A flow chart showing an exemplary operation of the charge control apparatus when the non-chargeable time frame is present.

Next, description is made of the setting of the charge period when any non-chargeable time frame appears in the chargeable time frame at step S006 with reference to FIG. 7. A variable n used in processing shown by FIG. 7 is a number representing an element number in an array, for example. "T" represents the name of an array for storing a remaining charge period, "TS" represents the name of an array for storing the charge start time, and "TE" represents the name of an array for storing the charge end time. In a flow chart of FIG. 7, "Tn" represents a value to be stored or a storage area at the element number n in the remaining charge period "T," and the same applies to "TSn" and "TEn." Storage areas for the data described above are previously secured in the memory 12 or extended during processing.

First, the processor 11 initializes the variable n to zero (S101).

The processor 11 acquires the period required for charge and substitutes it for Tn (which represents the remaining charge period and is T0 at this point). The processor 11 also acquires the use end time of the EV 9 and acquires a start time and an end time of the non-chargeable period (S102).

The processor 11 matches a charge start time (which is represented as TSn and is TS0 at this point) to the use end time of the EV 9 such that charge is performed close to the beginning of the chargeable time frame (S103). Next, the processor 11 calculates a charge end time (which is represented as TEn and is TE0 at this point) by adding T0 to TS0 (S104).

The processor 11 determines whether or not the calculated TE0 reaches the start time of the non-chargeable period (S105). In this case, it is determined whether or not the charge can be completed before the start time of the non-chargeable period. If TE0 does not reach or equals the start time of the non-chargeable period (Yes at S105), the following adjustment is not required since the charge can be completed before the start time of the non-chargeable period. The processor 11 determines (sets) TS0 and TE0 and ends the processing.

If TE0 exceeds the start time of the non-chargeable period (No at S105), the processor 11 resets the charge end time (TE0) to the start time of the non-chargeable period (S106). Next, the processor 11 calculates a remaining charge period (T1) at present by subtracting (TE0−TS0) from T0 (S107). If the determination result at step S105 is negative, the charge operation is temporarily ended at the start time of the non-chargeable period, but at that point, the EV is not charged to the extent that the scheduled running distance can be completed, and additional charge is needed. At step S107, the processor 11 calculates how long charge period is further required.

The processor 11 increments the variable n by one (S108).

The processor 11 matches a next charge start time (which is TS1 since n is incremented) to the end time of the non-chargeable time frame (S109). The processor 11 calculates a next charge end time TE1 by adding T1 to TS1 (S110).

The processor 11 determines whether or not a next (at this point, second) non-chargeable time frame is present (S111). A plurality of non-chargeable time frames may be present at time intervals, and the determination at step S111 is performed for dealing with such a case. If the second non-chargeable time frame is not present (No at S111), the processor 11 determines the charge start times (TS0, TS1) and the charge end times (TE0, TE1) calculated up to this point (S112) and ends the processing. If the second non-chargeable time frame is present (Yes at S111), the processing proceeds to S105.

If TE1 does not reach a start time of the second non-chargeable time frame (Yes at S105), the processor 11 determines the charge start times (TS0, TS1) and the charge end times (TE0, TE1) calculated up to this point (S112). If the determination result at S105 is negative (No at S105), the processor 11 resets the charge end time TE1 to the start time of the second non-chargeable time frame (S106), calculates a remaining charge period T2 (S107), and increments n to set n=2 (S108). The processor 11 sets a charge start time TS2 to an end time of the second non-chargeable period (S109) and calculates a charge end time TE2 by adding T2 to TS2 (S110).

The processor 11 determines whether or not a next (third) non-chargeable time frame is present (S111). If not (No at S111), the processor 11 determines the charge start times (TS0, TS1, TS2) and the charge end times (TE0, TE1, TE2) calculated up to this point (S112) and ends the processing. If the next (third) non-chargeable time frame is present (Yes at S111), the processing proceeds to S105.

Then, the processing from step S105 to step S111 is repeatedly performed with the variable n incremented by one. At step S112, the charge start times (TS0, TS1, ... TSn) and charge end times (TE0, TE1, ... TEn) are determined in accordance with the number of occurrences of the non-chargeable time frame. The processor 11 may permanently save the determined time data in the HDD 14.

Figure 8:
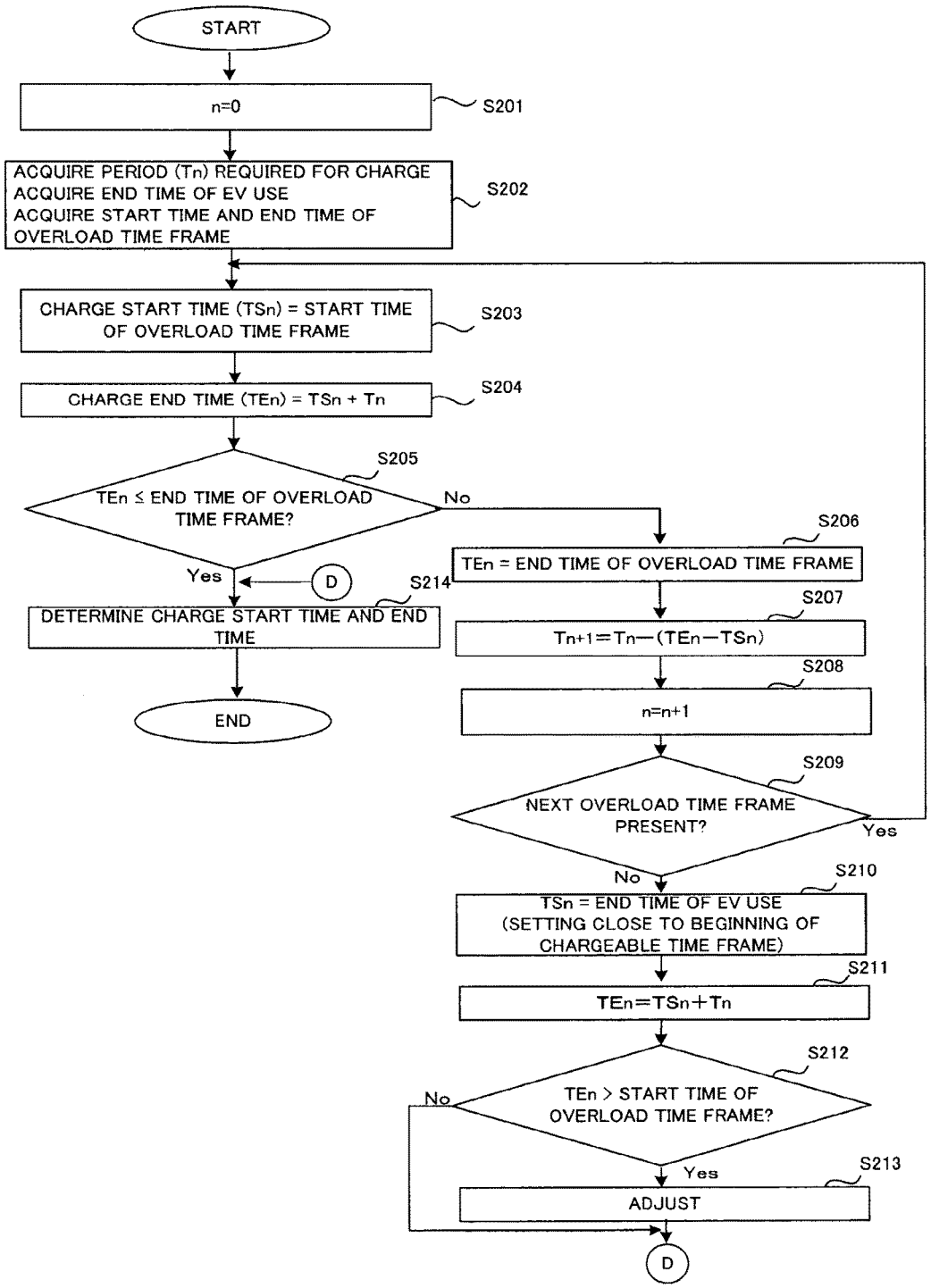
[FIG. 8] A flow chart showing an exemplary operation of the charge control apparatus when the overload time frame is present.

Next, FIG. 8 shows an exemplary detailed operation when any overload time frame is present at step S012 in FIG. 6. In FIG. 8, a variable n represents an element number in an array, for example. "Tn," "TSn," and "TEn" are the same as those in FIG. 7.

The processor 11 initializes the variable n to zero (S201). The processor 11 acquires the period required for charge and substitutes it for Tn (which is T0 at this point). The processor 11 acquires the use end time of the EV 9 transmitted from the input terminal apparatus 5 and acquires a start time and an end time of the overload time frame (S202). The processor 11 matches a charge start time (which is represented as TSn and is TS0 at this point) to the start time of the overload time frame (S203), and calculates a charge end time (which is represented as TEn and is TE0 at this point) by adding T0 to TS0 (S204).

The processor 11 determines whether or not the charge end time (TE0) reaches the end time of the overload time frame (S205). At step S205, it is determined whether or not the charge can be completed within the overload time frame. If the charge can be completed within the overload time frame, additional charge is not required and thus the processing proceeds to end. If the charge cannot be completed, an additional charge period needs to be secured, and additional processing is performed.

If the charge end time (TE0) does not reach or equals the end time of the overload time frame at step S205 (Yes at S205), the processor 11 sets and determines the charge start time (TS0) and the charge end time (TE0) by saving them in the HDD 14 (S214) and ends the processing.

If the charge end time (TE0) exceeds the end time of the overload time frame (No at S205), the processor 11 resets TE0 to the end time of the overload time frame (S206). Then, the processor 11 sets the result calculated by subtracting (TE0−TS0) from T0 to a remaining charge period (T1) (S207). At this point, the charge period is not sufficient, and charge is needed for the remaining period T1.

The processor 11 increments the variable n by one (S208).

The processor 11 determines whether or not a next (second) overload time frame is present (S209). This is performed to deal with the case where a plurality of overload time frames are present. If the second overload time frame is not present (No at S209), the processor 11 sets the remaining period T1 close to the beginning of the chargeable time frame. Specifically, the processor 11 sets TSn (which is TS1 at this point) to the use end time of the EV 9 (S210) and calculates TEn (TE1 at this point) by adding T1 to TS1 (S211).

The processor 11 determines whether or not TEn (which is TE1 at this point) exceeds the start time of the overload time frame (S212). The determination is equal to determination of whether the remaining period T1 falls within the period from the use end time of the EV9 to the start time of the overload time frame. If TEn (which is TE1 at this point) does not exceed the start time of the overload time frame (No at S212), the processing proceeds to S214, and the processor 11 sets and determines the charge start times and the charge end times by saving them in the HDD 14 (S214). If TEn (TE1) exceeds the start time of the overload time frame (Yes at S212), the processor 11 adjusts the schedule such that charge for a period corresponding to the excess is performed after the end time of the overload time frame (S213), and proceeds to step S214.

At step S213, the adjustment when n=1 is performed as shown in the following steps S213-1 to S213-5. At n=2 and afterward, the operations from steps S213-1 to S213-5 are performed in accordance with the value of the variable n. After step S213, the processing proceeds to step S214, and the processor 11 determines the charge start times and the charge end times calculated up to that point.

(S213-1) Set TE1 to the start time of the overload time frame.
(S213-2) Determine T2 by calculating T2=T1−(TS1−TE1).
(S213-3) Increment the variable n to set n=2.
(S213-4) Set TS2 to the end time of the overload time frame.
(S213-5) Calculate TE2 by adding T2 to TS2.

When TE2 reaches the next overload time frame, the processor 11 performs the steps S213-1 to S213-5 in the case where n=2.

Description is returned to the determination at step S209. If the next (second) overload time frame is present (Yes at S209), the processing proceeds to step S203 to perform processing for the second overload time frame in the case where n=1. Then, the processing is repeatedly performed in accordance with the value of the variable n. The values of TS0, TS1, ... , TSn are calculated and the values of TE0, TE1, ... , TEn are calculated in accordance with the value of the variable n.

If both the non-chargeable time frame and the overload time frame are present, the non-chargeable time frame is treated as the use time frame of the EV 9, and each step described in FIG. 8 is performed for each charge period (period required for charge) divided at step S006.

In the present embodiment, the following advantages are expected.

(1) The charge of the EV is concentrated in the overload time frame to allow stabilization of the system without mounting an expensive large-capacity mounted battery.

(2) The charge of the EV is performed in the time frame in which the renewable energy such as sunlight, wind power, and water power is produced in large amount to allow preferential use of the renewable energy, thereby achieving effective use of the renewable energy and reduced use of power in conventional thermal power generation and water power generation.

Embodiment 2

Figure 9:
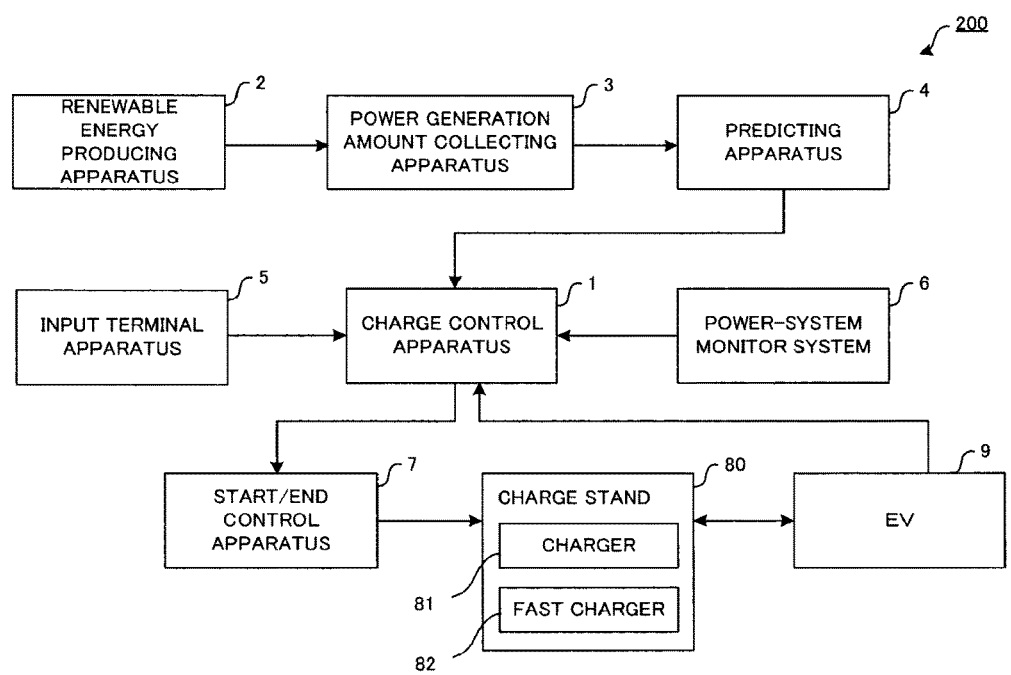
[FIG. 9] A block diagram showing an exemplary configuration of a system according to Embodiment 2.

Embodiment 2 is an example of implementation in which load can be further reduced by using either a fast charger or a normal charger as appropriate. FIG. 9 shows a functional block diagram of Embodiment 2. A charge system 200 includes a charge stand 80 having a charger 81 (normal charger) and a fast charger 82. The charger 81 is a charger used also in Embodiment 1, and the fast charger 82 is a charger capable of charge faster than the charger 81. In the present embodiment, the charger 81 enables charge of approximately 1.5 KW to 3 KW per hour, whereas the fast charger 82 enables charge of approximately 50 KW per hour. These numerical values are only illustrative. A charge control apparatus 1 according to Embodiment 2 in the charge system 200 performs scheduling of a charge start time and a charge end time not only when the charger 81 is used but also when the fast charger 82 is used for charge. Since the remaining configuration is identical to that in Embodiment 1, description thereof is omitted. The reference numerals of components in the charge control apparatus 1 of Embodiment 2 are provided by using the reference numerals in Embodiment 1 (see FIG. 2).

Figure 10:
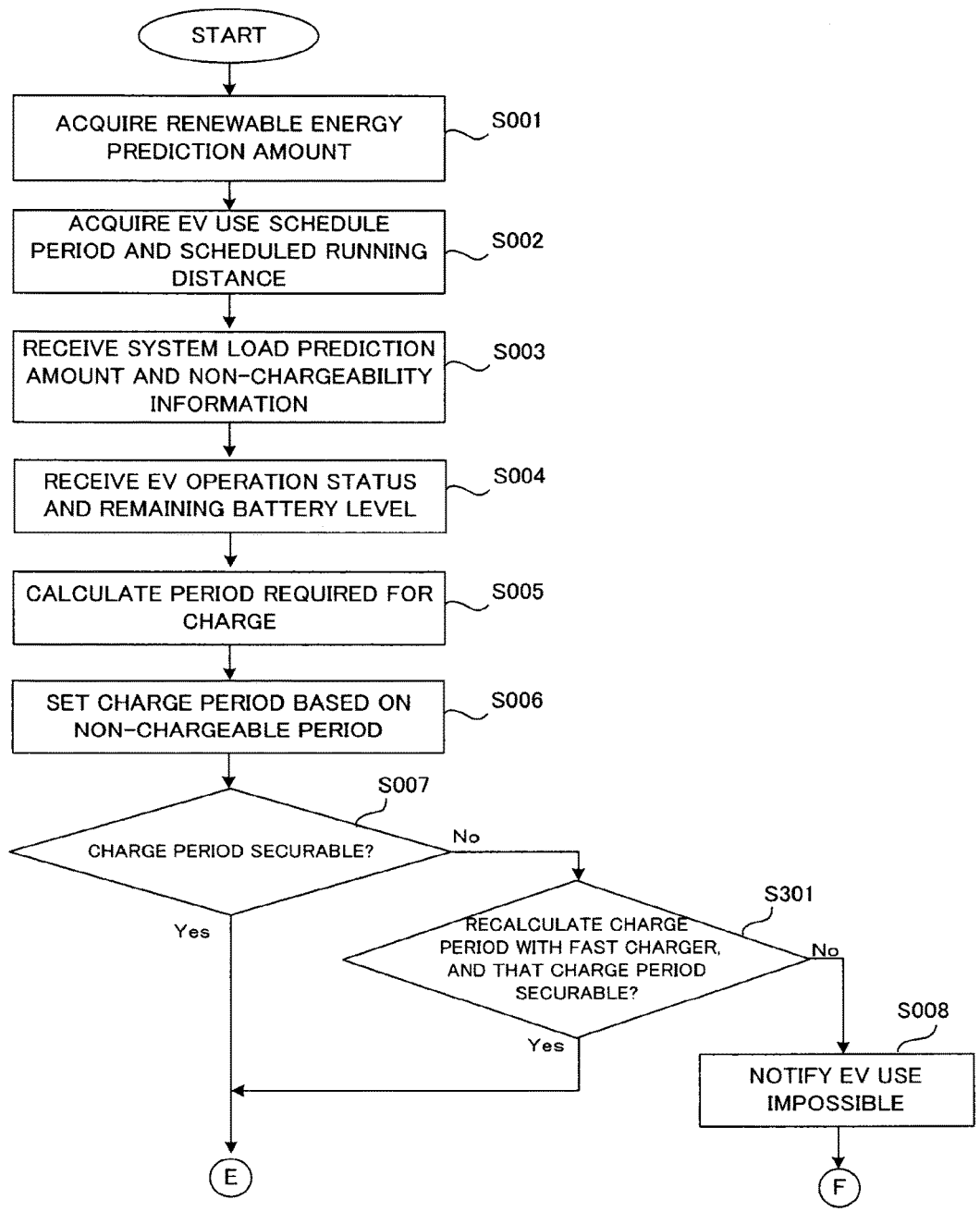
[FIG. 10] A flow chart (1) showing an exemplary operation of a charge control apparatus according to Embodiment 2.
Figure 11:
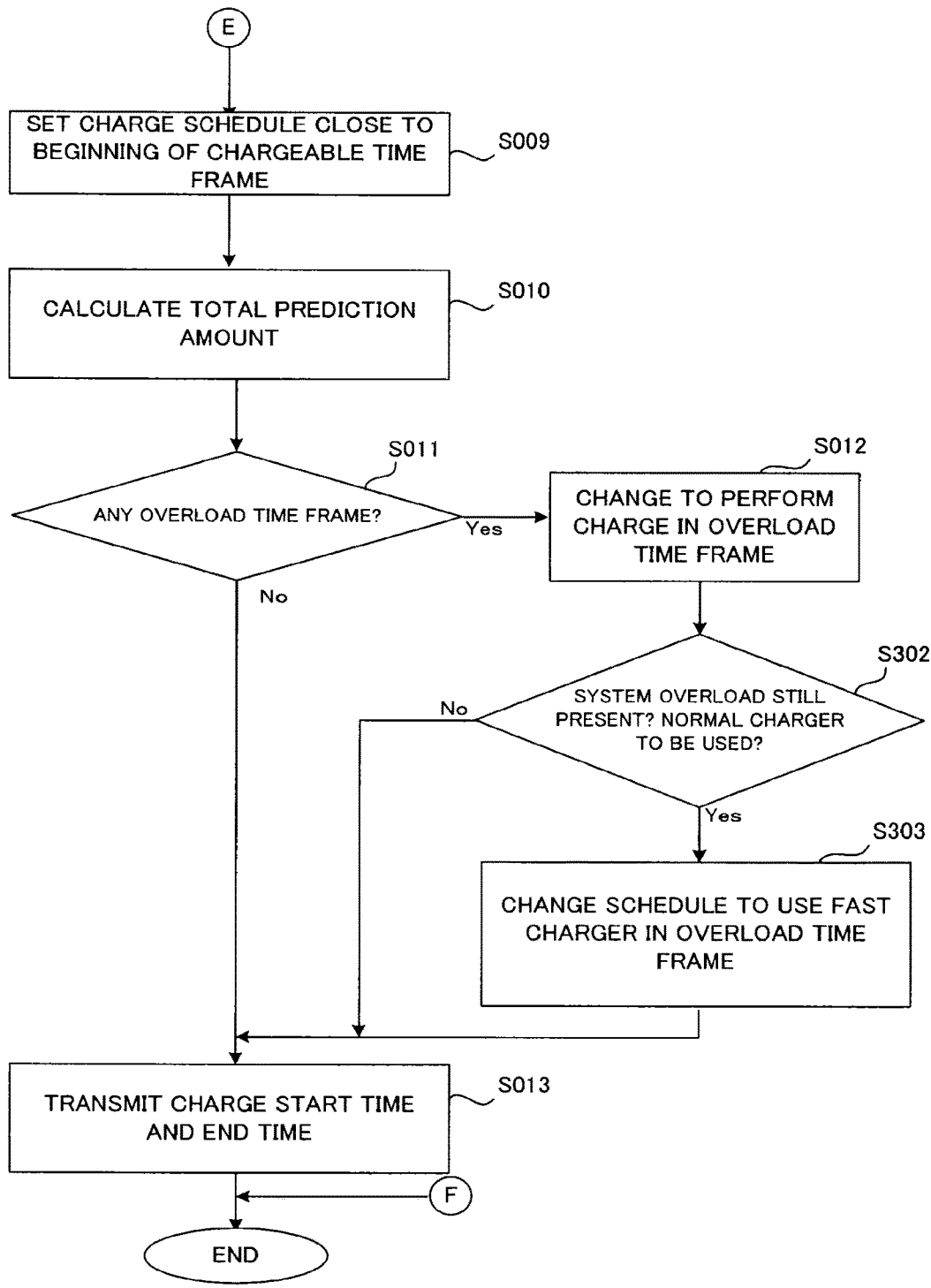
[FIG. 11] A flow chart (2) showing the exemplary operation of the charge control apparatus according to Embodiment 2.

FIG. 10 and FIG. 11 are flow charts showing an exemplary operation of the charge control apparatus 1 according to Embodiment 2. In FIG. 10 and FIG. 11, since the same reference numerals as those in Embodiment 1 indicate the same operations as those in Embodiment 1, description thereof is omitted.

A processor 11 determines, at step S007, whether or not a charge period of the EV 9 can be secured by comparing a chargeable time frame (see FIG. 4) with a period required for charge (S007). If not (No at S007), the processor 11 then recalculates a period required for charge using the fast charger 82 instead of the charger 81 and determines whether or not the recalculated period falls within the chargeable time frame (S301). When any non-chargeable time frame is present, the processor 11 performs the processing described in FIG. 7 by replacing the period required for charge (T0) with the period for charge with the fast charger 82 at step S301. Based on the result of the processing, the processor 11 determines whether or not the period falls within the chargeable time frame.

If not (No at S301), the processor 11 notifies a user that the EV 9 cannot be used (S008). If Yes at S301, the use of the fast charger is set and the processing proceeds to step S009. When the determination at step S301 is performed, the following processing operations are performed assuming that the fast charger 82 is used.

At step S012 in FIG. 11, similarly to Embodiment 1, the processor 11 changes the charge schedule such that charge is performed in the overload time frame with a higher priority (S012). After step S012, the processor 11 determines whether or not overload is still present and whether or not the charger 81 is scheduled to be used (S302). The determination of whether or not overload is still present is performed by comparing the power exceeding the threshold value with the power consumed during charge with the charger 81.

If the results of both the determinations at step S302 are positive (Yes at S302), the processor 11 changes the schedule such that the fast charger 82 is used in the overload time frame (S303). The processor 11 performs the processing described in FIG. 8 by replacing the period required for charge (T0) with the period for charge in the fast charger 82.

Thus, the charge time frame can be included easily in the overload time frame and the amount of power consumption from charge can be increased to reduce the excessive supply power. When the determination result at step S302 is negative (No at S302), the processing proceeds to step S013.

Although each of the embodiments described above employs the scheduling with no margin for time such as the setting of the start of charge immediately after the use end time of the EV, the scheduling may be changed to have a margin of 15 to 30 minutes, for example.

Although each of the embodiments described above is configured to acquire the system load prediction amount from the power-system monitor system 6, the aspects are not limited thereto. The system load prediction amount may not be acquired from the power-system monitor system 6. In this case, only the renewable energy prediction amount can be used to realize each of the embodiments by adjusting the threshold value for determining the overload to a lower level. When the system load prediction amount cannot be obtained, the charge control apparatus 1 may determine the system load prediction amount from the past results.

The charge control apparatus 1 may be provided as a charge period adjusting apparatus. A control section corresponds to the processor 11. The processor 11 extracts a charge period adjusting program stored previously in the HDD 14 or the ROM 13 to the memory 12 and executes the program to provide the respective functions of each of the embodiments in cooperation with hardware. An acquiring section corresponds to the network I/F 17 of each of the embodiments. When the user manually inputs information, the acquiring section corresponds to the input apparatus 15.

Although each of the embodiments has been described in the case where the functions for implementing the aspects of the embodiments are previously recorded within the apparatus, the present invention is not limited thereto, and similar functions may be downloaded to the apparatus via a network, or a recording medium having similar functions stored thereon may be installed on the apparatus. The recording medium may take any form such as a CD-ROM that allows storage of programs and read-out by the apparatus. The functions obtained previously through the installation or downloading may be implemented in cooperation with the operation system (OS) or the like in the apparatus.

The embodiments allow effective use of supplied power.

Although some embodiments of the present invention have been described, those embodiments are illustrative and are not intended to limit the scope of the present invention. The novel embodiments can be implemented in various other forms, and various omissions, substitutions, and modifications can be made thereto without departing from the spirit or scope of the present invention. These embodiments and their variations are encompassed within the spirit or scope of the present invention and within the invention set forth in the claims and the equivalents thereof.

The invention claimed is:

1. A charge period adjusting apparatus comprising:
an acquiring section configured to acquire a scheduled amount of power supply of an electric system including a charger connected during charge of an electric vehicle; and
a control section configured to set a charge period such that the electric vehicle is charged by the charger in a first time frame in which the scheduled amount of power supply acquired by the acquiring section exceeds a threshold value, wherein the scheduled amount of power supply is a predicted amount of power per unit time to be supplied, and wherein the control section derives the first time frame from the scheduled amount of power supply and makes a schedule so as to perform charging in the first time frame, and when the charging is not completed in the first time frame, a remaining charging is scheduled to be performed at a beginning of a chargeable time of the electric vehicle.

2. The charge period adjusting apparatus according to claim 1, wherein the acquiring section is further configured to acquire a use schedule period of the electric vehicle, to acquire information about a scheduled running distance or a destination of the electric vehicle during the use, and to acquire a remaining charge level of the electric vehicle, and the control section is configured to calculate a period required for charge of the electric vehicle based on the information about the scheduled running distance or the destination and the remaining charge level, and to determine whether or not charge is completed until the use schedule period starts.

3. The charge period adjusting apparatus according to claim 1, wherein the acquiring section is configured to acquire a scheduled amount of power supply including a power amount scheduled to be supplied from renewable energy.

4. The charge period adjusting apparatus according to claim 1, wherein the acquiring section is further configured to acquire a scheduled time frame in which power supply is stopped in the electric system, and the control section is configured to set the charge period such that the charge is not performed in the scheduled time frame in which the power supply is stopped.

5. The charge period adjusting apparatus according to claim 2, wherein the control section is configured to set the charge period assuming that the electric vehicle is charged by a faster charger configured to charge faster than the charger when it is determined that the charge is not completed until the use scheduled period.

6. A charge system comprising:

a predicting apparatus configured to calculate an amount of power supply scheduled to be supplied from renewable energy; and a charge period adjusting apparatus configured to include the amount of power supply calculated in the predicting apparatus, to acquire a scheduled amount of power supply of an electric system including a charger connected during charge of an electric vehicle, and to set a charge period such that the electric vehicle is charged by the charger in a first time frame in which the scheduled amount of power supply exceeds a threshold value, wherein the scheduled amount of power supply is a predicted amount of power per unit time to be supplied, and wherein the charge period adjusting apparatus derives the first time frame from the scheduled amount of power supply and makes a schedule so as to perform charging in the first time frame, and when the charging is not completed in the first time frame, a remaining charging is scheduled to be performed at a beginning of a chargeable time of the electric vehicle.

7. The charge system according to claim 6, further comprising:

a terminal apparatus configured to acquire a use schedule period of the electric vehicle, and information about a scheduled running distance or a destination of the electric vehicle during the use, wherein the charge period adjusting apparatus is further configured to acquire the use schedule period of the electric vehicle, and the information about the scheduled running distance or the destination acquired in the terminal apparatus, to acquire a remaining charge level of the electric vehicle from the electric vehicle, to calculate a period required for charge of the electric vehicle based on the information about the scheduled running distance or the destination and the remaining charge level, and to determine whether or not charge is completed until the use schedule period starts.

8. The charge system according to claim 6, wherein the charge period adjusting apparatus is further configured to acquire a scheduled time frame in which power supply is stopped in the electric system, and to set the charge period such that the charge is not performed in the scheduled time frame in which the power supply is stopped.

9. The charge system according to claim 7, wherein the charge period adjusting apparatus is configured to set the charge period assuming that the electric vehicle is charged by a faster charger configured to charge faster than the charger when it is determined that the charge is not completed until the use schedule period.

10. A non-transitory computer readable medium having stored thereon a charge period adjusting program for causing a computer to perform processing of:

acquiring scheduled amount of power supply of an electric system including a charger connected during charge of an electric vehicle, the scheduled amount of power supply being a predicted amount of power per unit time to be supplied; and setting a charge period such that the electric vehicle is charged by the charger in a time frame in which the scheduled amount of power supply exceeds a threshold value, deriving the first time frame from the scheduled amount of power supply to make a schedule so as to perform charging in the first time frame, and scheduling for a remaining charging to be performed at a beginning of a chargeable time of the electric vehicle, when the charging is not completed in the first time frame.

11. The non-transitory computer readable medium according to claim 10, for causing a computer to further perform processing of:

acquiring a use schedule period of the electric vehicle;
acquiring information about a scheduled running distance or a destination of the electric vehicle during the use;
acquiring a remaining charge level of the electric vehicle;
calculating a period required for charge of the electric vehicle based on the information about the scheduled running distance or the destination and the remaining charge level; and
determining whether or not charge is completed until the use schedule period starts.

12. The non-transitory computer readable medium according to claim 10, wherein the acquiring includes processing of acquiring a scheduled amount of power supply including a power amount scheduled to be supplied from renewable energy.

13. The non-transitory computer readable medium according to claim 10, for causing a computer to further perform processing of:

acquiring a scheduled time frame in which power supply is stopped in the electric system; and setting the charge period such that the charge is not performed in the scheduled time frame in which the power supply is stopped.

14. The non-transitory computer readable medium according to claim 11, for causing a computer to further perform processing of setting the charge period assuming that the electric vehicle is charged by a faster charger configured to charge faster than the charger when it is determined that the charge is not completed until the use schedule period.

* * * * *